US009476175B2

(12) United States Patent
Chen et al.

(10) Patent No.: US 9,476,175 B2
(45) Date of Patent: Oct. 25, 2016

(54) SOIL HYDROPHILIZATION AGENT AND METHODS FOR USE

(71) Applicant: RHODIA OPERATIONS, Aubervilliers (FR)

(72) Inventors: Zhiyun Chen, Newton, PA (US); Jean-Christophe Castaing, Sevres (FR); Marie-Pierre Labeau, Sevres (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/520,387

(22) Filed: Oct. 22, 2014

(65) Prior Publication Data

US 2015/0056022 A1    Feb. 26, 2015

Related U.S. Application Data

(62) Division of application No. 12/803,711, filed on Jul. 2, 2010, now Pat. No. 8,895,686.

(51) Int. Cl.
| | |
|---|---|
| C09K 17/32 | (2006.01) |
| E02D 3/00 | (2006.01) |
| A01G 9/10 | (2006.01) |
| A01G 13/00 | (2006.01) |
| C09K 17/18 | (2006.01) |
| C08L 1/26 | (2006.01) |
| C08L 1/28 | (2006.01) |
| C08L 3/02 | (2006.01) |
| C08L 5/04 | (2006.01) |
| C08L 5/06 | (2006.01) |
| A01G 31/00 | (2006.01) |

(52) U.S. Cl.
CPC .............. *E02D 3/00* (2013.01); *A01G 9/1086* (2013.01); *A01G 13/0262* (2013.01); *C08L 1/26* (2013.01); *C08L 1/28* (2013.01); *C08L 1/284* (2013.01); *C08L 1/286* (2013.01); *C08L 3/02* (2013.01); *C08L 5/04* (2013.01); *C08L 5/06* (2013.01); *C09K 17/18* (2013.01); *C09K 17/32* (2013.01); *A01G 2009/1053* (2013.01); *A01G 2031/007* (2013.01); *Y02P 60/216* (2015.11); *Y10S 71/903* (2013.01)

(58) Field of Classification Search
CPC .................................................. C09K 17/32
See application file for complete search history.

(56) References Cited

U.S. PATENT DOCUMENTS

| | | |
|---|---|---|
| 3,472,840 A | 10/1969 | Stone et al. |
| 4,031,307 A | 6/1977 | DeMartino et al. |
| 4,663,159 A | 5/1987 | Brode, II et al. |
| 5,037,930 A | 8/1991 | Shih |
| 5,089,252 A | 2/1992 | Grollier et al. |
| 5,202,400 A | 4/1993 | Itoh et al. |
| 5,387,675 A | 2/1995 | Yeh |
| 5,473,059 A | 12/1995 | Yeh |
| 5,489,674 A | 2/1996 | Yeh |
| 5,532,350 A | 7/1996 | Cottrell et al. |
| 5,676,747 A | 10/1997 | Brown |
| 5,866,664 A | 2/1999 | McCallum, III et al. |
| 5,927,003 A | 7/1999 | Miller et al. |
| 6,071,434 A | 6/2000 | Davis et al. |
| 6,210,689 B1 | 4/2001 | Martino et al. |
| 6,455,661 B1 | 9/2002 | Antal et al. |
| 6,639,126 B1 | 10/2003 | Sewalt et al. |
| 6,718,835 B2 | 4/2004 | Wang et al. |
| 7,208,554 B2 | 4/2007 | Wo et al. |
| 7,247,693 B2 | 7/2007 | Liu et al. |
| 2002/0042346 A1 | 4/2002 | Hamersky et al. |
| 2003/0027787 A1 | 2/2003 | Couture et al. |
| 2004/0024104 A1 | 2/2004 | Ota et al. |
| 2006/0029561 A1 | 2/2006 | Gunn et al. |
| 2008/0033163 A1 | 2/2008 | Krishnamurthy et al. |

FOREIGN PATENT DOCUMENTS

| | | |
|---|---|---|
| EP | 0686643 B1 | 6/1995 |
| EP | 0934343 B1 | 10/1997 |
| WO | WO-2006/017589 A2 | 2/2006 |
| WO | WO-2006/131213 A1 | 12/2006 |
| WO | WO-2008/058769 A1 | 5/2008 |

OTHER PUBLICATIONS

M. Abu-Zreig, et al., "Effect of Application of Surfactants on Hydraulic Properties of Soils", Biosystems Engineering (2003) 84 (3), 363-372.
Noushine Shahidzadeh, et al., "Effect of Wetting on Gravity Drainage in Porous Media", Transport in Porous Media 52: 213-227, 2003.
Eric J. Henry, et al., "Numerical Demonstration of Surfactant Concentration-Dependent Capillarity and Viscosity Effects on Infiltration from a Constant Flux Line Source", Journal of Hydrology (2006) 329, 63-74.
Sagar Pal, et al., "Synthesis and Characterization of Cationic Guar Gum: A High Performance Flocculating Agent", Journal of Applied Polymer Science, vol. 105, 3240-3245 (2007).
Ben-Hur, et al., Soil Science Society of America Journal, 53, 1173-1177, 1989.
Malik, et al., Soil Science of America Journal, 55(2), 380-383, 1991.

*Primary Examiner* — Liam J Heincer

(57) ABSTRACT

Disclosed are soil additives capable of hydrophilizing soil particles and/or increase available water capacity in soil. The soil additive are capable of increasing the available water content/capacity (AWC) in soils, the additive in one embodiment comprising a polymer composition having a hydrophilic portion and a hydrophobic portion, wherein the hydrophobic portion of the copolymer binds with the soil particle surface and the hydrophilic portion of the copolymer can bind with water. This results in the prevention, arrest or decelerated loss of water from the targeted area, for example the plant root zone, which allows for improved water usage efficiency by plants, grasses, vegetation, etc.

5 Claims, 5 Drawing Sheets

SOIL HYDROPHILIZATION AGENT AND METHODS FOR USE

CROSS REFERENCE TO RELATED APPLICATIONS

This application is a Divisional Application of U.S. patent application Ser. No. 12/803,711, filed Jul. 2, 2010, which claims the benefit of U.S. Provisional Application Ser. No. 61/270,128, filed Jul. 2, 2009, herein incorporated by reference.

FIELD OF INVENTION

This invention relates to methods and compositions relating to soil additives and, in particular, to soil additives that hydrophilize soil particles and/or increase available water capacity in soil.

BACKGROUND OF THE INVENTION

Water scarcity is a major constraint to human and agricultural development. Roughly 70% of the fresh water consumed is directed towards agricultural-related usage, for example as irrigation water, which in turn accounts for roughly 90% of agricultural usage. As the demand for fresh water through agricultural development as well as human development increases, more effective uses of water are becoming necessary. This need is even more pronounced in light of the increasing scarcity of fresh water. There is also an increasing demand for fresh water in food production and non-food related raw materials such as biofuel, biomass and renewable biomaterials apart from the aforementioned use. Accordingly, there is a growing need for an improved and more efficient usage of fresh water.

Fresh water is lost in agriculture applications through two main pathways: (1) run-off or evaporation and (2) drainage out of plant root zone. With respect to run-off, the slow or arrested penetration of water into soil will lead to run-off of water where the soil area is, in particular, sloped or angled. Another effect is an accumulation of water on a flat/level soil surface, which allows for water evaporation through extended exposure to the atmosphere. The slow permeation is caused by several mechanisms, such as the destruction of a soil's porous structure, as indicated by soil crust formation. Water repellent soil can develop when the soil becomes hydrophobic and substantially or totally resists the infiltration of water into it.

With respect to drainage, the drainage of water out of the root zone may be caused by a low water holding capacity of the soil and/or uneven distribution of water. The soil water holding capacity is determined by the soil texture and amount of organic matter in soil. For example, usually coarse-textured soils, e.g., sandy soils, have a much smaller water holding capacity than fine-textured soils, e.g., loamy soil. The uneven distribution of water can be caused by the application method of irrigation water (e.g. furrow irrigation) and the heterogeneity of soil composition. Preferential flow may also occur in heterogeneous soils, and it funnels the water supply quickly out of the root zone and causes the inefficiency of water usage.

Several approaches were used in an attempt to increase the agriculture water usage in agriculture, one of which was the use of surfactants. It is generally known that surfactants can reduce the surface tension of the irrigation water, but also face drawbacks, for example as disclosed in (among others) U.S. Pat. No. 5,927,003 to Miller et al., incorporated herein by reference.

It is also known that water-absorbent polymers can assist in improving water management. These absorbent polymers otherwise known as superabsorbents are used to increase water usage efficiency. Superabsorbents have cross-linked polymer network structures, which can hold water several to a few hundred times the original superabsorbent volume. Superabsorbents include hydrolysis products of starch-acrylonitrile graft polymers, carboxymethylcellulose, cross-linked polyacrylates, cross-linked polyacrylamides, polyvinyl alcohols, polyacrylonitrile and polyethylene oxide. Several U.S. patents as described below, for example, disclose a variety of polymers used in agriculture for improving water management.

Superabsorbents are applied as soil additives and are typically buried, manually or mechanically, within the vicinity of root zone. As such, these superabsorbents can swell and hold water when irrigation water is applied, and release the water during the irrigation interval or a dry period. Burying of superabsorbents can typically be accomplished by temporarily removing any plants from the soil, typically done through a gardening-type application. However, the drawbacks with large scale undertakings such as widespread turf and in-ground crop applications are obvious, as it is generally impractical or financially infeasible to remove all or most plants and/or top layer of soil. Further, there is a relatively high cost associated with such applications as large amounts of superabsorbents are generally needed to achieve sufficient performance.

Accordingly, there is a need for an improved soil additive that can provide improved water usage by plants and grasses. There is also a need for an improved method to apply the polymer within soil that has increased efficacy (relative to the total amount of polymer used), can target the most advantageous or needed locations in the soil and can improved water usage efficiency by plants and grasses.

SUMMARY OF INVENTION

In one aspect, the present invention is a method of increasing water retention in soil comprising applying a soil additive to soil thereby increasing the available water capacity in the soil. The soil additive can, for example, be applied to the surface or near the top surface of the soil, into the soil or into a layer within the soil, in irrigation water or other carrier that is then applied to the soil, or the like.

The present invention, in one aspect, is a soil additive for increasing available water capacity in soil, the additive comprising a polymer composition having a hydrophilic portion and a hydrophobic portion, wherein the hydrophilic portion of the polymer composition can bind with water.

In another aspect, the present invention is a soil additive for increasing available water capacity in soil, the additive comprising a polymer composition having a first portion having an affinity towards soil particles, or the surface of a soil particle, and a second portion having an affinity towards water. Both portions might have similar or the same chemical composition.

In another aspect, the present invention is a soil additive comprising a polymer composition a hydrophilic portion and a portion having an affinity for the surface of a soil particle, wherein the hydrophilic portion of the polymer can bind with water, wherein the portion having an affinity for the surface of a soil particle can be hydrophobic.

In another embodiment, the soil additive of the present invention is a polymer having a weight average molecular weight of between about 5,000 daltons and 500,000 daltons. In another embodiment, the soil additive of the present invention is a polymer having a weight average molecular weight of between about 200,000 daltons and 1,000,000 daltons. In another embodiment, the soil additive of the present invention is a polymer having a weight average molecular weight of up to about 5,000,000 daltons. In another embodiment, the soil additive of the present invention is a polymer having a weight average molecular weight of up to about 25,000,000 daltons. In a further embodiment, the soil additive of the present invention is a polymer having a weight average molecular weight of up to about 50,000,000 daltons. In yet a further embodiment, the soil additive of the present invention is a hydrogel particle having a size of between 50 nanometers to 5 micrometers.

In one embodiment, the present invention is a polymer capable of hydrophilizing a soil particle comprising an anionic, neutral or cationic polysaccharide. In one embodiment, the polysaccharide is selected or derived from the group consisting of:

a. Polysaccharides of plant origin, including but not limited to:
   i. Galactomannans, fenukreek gum, mesquite gum, guar gum, tara gum, locust bean gum, cassia gum, and their derivatives such as hydroxyalkyl guar, carboxyalkyl guar, carboxyalkyl hydroxyalkyl guar, hydrophobically modified guar, hydrophobically modified hydroxyalkyl guar, hydrophobically modified carboxyalkyl guar, hydrophobically modified carboxyalkyl hydroxyalkyl guar,
   ii. Starch and starch derivatives, amylopectin and amylopectin derivatives;
   iii. Cellulose and cellulose derivatives (hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, etc.);
   iv. Lignocellulose;
   v. Xylan, arabinoxylan, glucans, xyloglucans, and other plant cell wall hemicelluloses;
   vi. Pectin, inulin, konjac gum;
b. Polysaccharides including but not limited to algaes, such as carrageenan, agar, alginates, ulvans, chitin, chitosan, etc.;
c. Biopolysaccharides: xanthan gum, welan gum, and succinoglycans, gellan, levan, pullulan, mannan, mellan, dextran;
and mixtures thereof.

In another embodiment, the polymer is selected from a cationic guar or cationic starch. In another embodiment, the cationic polysaccharide is selected from a hydroxypropyl trimethylammonium chloride guar or starch.

In another aspect, the soil additive is a copolymer. The copolymer can contain carboxylate groups, amide groups, hydroxyl groups, zwitterionic groups or any combination thereof. The copolymer can be produced from at least one monomer comprising acrylate, methacrylate, acrylamide, methacrylamide, vinyl alcohols, allyl alcohols, vinyl acetates, zwitterionic monomers and other ethylenically unsaturated monomers.

In another aspect, the soil additive of the present invention has formula:

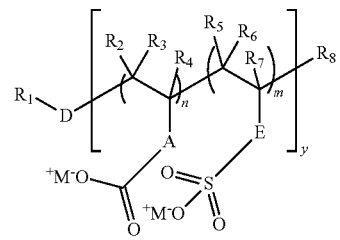

wherein n is an integer of from 10 to 10000; wherein m can be an integer of from 0 to 10000; wherein y is an integer of from 1 to 10000, wherein $R_1$ comprises one or multiple phosphonate groups, silicate groups, siloxane groups, phosphate groups, phosphinate groups or any combination thereof; $R_2$-$R_8$ can individually be hydrogen, or a branched, linear or cyclic $C_1$-$C_6$ hydrocarbon with or without heteroatom; $M^+$ can be any suitable counterion or a hydrogen; wherein "A," "D" and "E" are each independently absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In another embodiment, n is an integer of from 1 to 5000. In another embodiment, n is an integer of from 1 to 1000. In yet another embodiment, n is an integer of from 10 to 3000. In yet another embodiment, n is an integer of from 25 to 1000. In yet another embodiment, n is an integer of from 25 to 100. In one embodiment, m is an integer of from 1 to 7500. In another embodiment, m is an integer of from 10 to 5000. In another embodiment, m is an integer of from 10 to 3000. In yet another embodiment, m is an integer of from 10 to 1000. In another embodiment, m is an integer of from 25 to 1000. In another embodiment, m is an integer of from 25 to 500. In one embodiment, y is an integer of from 1 to 5000. In another embodiment, y is an integer of from 1 to 2500. In another embodiment, y is an integer of from 10 to 100.

In another aspect, the present invention is a polymer having formula:

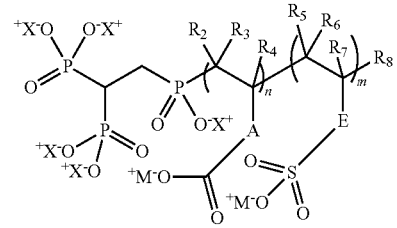

wherein n is an integer of from 10 to 10000; wherein m is an integer of from 10 to 10000; $R_2$-$R_8$ can individually be hydrogen, or a branched, linear or cyclic $C_1$-$C_6$ hydrocarbon or hydroxylalkyl groups; wherein $M^+$ and $X^+$ are, individually, different or the same counterion or a hydrogen; wherein "A" and "E" are each independently absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In another embodiment, n is an integer of from 1 to 5000. In another embodiment, n is an integer of from 1 to 1000. In yet another embodiment, n is an integer of from 10 to 3000. In one embodiment, m is an integer of from 1 to 7500. In another embodiment, m is an integer of from 10 to 5000. In another embodiment, m is an integer of from 10 to 3000. In yet another embodiment, m is an integer of from 10 to 1000.

In another aspect, the present invention is a polymer having formula:

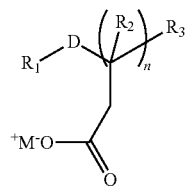

wherein n is an integer of from 1 to 1000; wherein $R_1$ comprises one or multiple phosphonate groups, silicate groups, siloxane groups, phosphate groups, phosphinate groups or any combination thereof; $R_2$-$R_3$ can individually be hydrogen, or a branched, linear or cyclic $C_1$-$C_6$ hydrocarbon with or without heteroatom; $M^+$ can be any suitable counterion or a hydrogen; wherein "D" is absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In another embodiment, n is an integer of from 1 to 5000. In another embodiment, n is an integer of from 1 to 1000. In yet another embodiment, n is an integer of from 10 to 3000.

In another aspect, the present invention is a polymer having formula:

wherein n is an integer of from 1 to 1000; wherein $R_1$ comprises one or multiple phosphonate groups, silicate groups, siloxane groups, phosphate groups, phosphinate groups or any combination thereof; $R_2$ can individually be hydrogen, or a branched, linear or cyclic $C_1$-$C_6$ hydrocarbon with or without heteroatom; wherein "D" is absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In another embodiment, n is an integer of from 1 to 5000. In another embodiment, n is an integer of from 1 to 1000. In yet another embodiment, n is an integer of from 10 to 3000.

In another aspect, the present invention is a copolymer having formula:

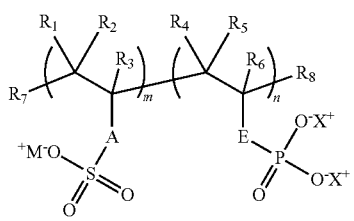

wherein m is zero or an integer of from about 1 to about 10000; wherein n is zero or an integer from about 1 to about 10000; wherein $M^+$ is a counterion or a hydrogen cation; wherein $X^+$ is a counterion or a hydrogen; wherein $R_1$-$R_8$ are, individually, hydrogen, a branched $C_1$-$C_6$ hydrocarbon, a linear $C_1$-$C_6$ hydrocarbon or a cyclic $C_1$-$C_6$ hydrocarbon or hydroxylalkyl groups; wherein "A" and "E" are each independently absent or represent a linear or branched $C_1$-$C_5$ hydrocarbon group, a $C_1$-$C_5$ alkoxy group, -oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In one embodiment, m is an integer of from about 1 to 200 and n is an integer from about 1 to 50.

In another aspect, the present invention is a method of increasing the available water capacity in soil comprising: (a) obtaining a soil additive comprising a polymer composition a (i) hydrophilic portion capable of binding with or has an affinity towards water and (ii) a hydrophobic portion capable of binding with or has an affinity towards the soil particle surface, wherein the soil additive is capable of hydrophilizing a soil particle; (b) and applying the polymer of claim 1 to soil.

In another aspect, the present invention is a method of modifying at least a portion of the surface area of a soil particle comprising: (a) obtaining a polymer having formula:

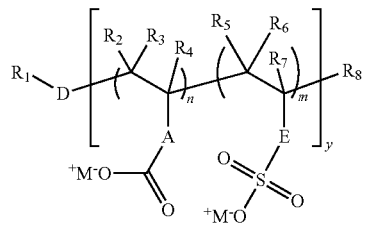

wherein n is an integer of from 10 to 10000; wherein m is an integer of from 0 to 10000; wherein y is an integer of from 1 to 10000; wherein $R_1$ comprises at least one phosphonate group, silicate group, siloxane group, phosphate group, phosphinate group or any combination thereof; wherein $R_2$, $R_3$, $R_4$, $R_5$, $R_6$, $R_7$ and $R_8$ are each independently a hydrogen or a branched, linear or cyclic $C_1$-$C_6$ hydrocarbon; wherein $M^+$ is a counterion or hydrogen; wherein "A," "D" and "E" are each independently absent, a linear or branched $C_1$-$C_5$ hydrocarbon group, a $C_1$-$C_5$ alkoxy group, oxy group (—O—), iminyl (—NH—), or substituted iminyl (—NR—), wherein R is a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl; and (b) applying such polymer to soil.

DETAILED DESCRIPTION OF INVENTION

Figure 1:
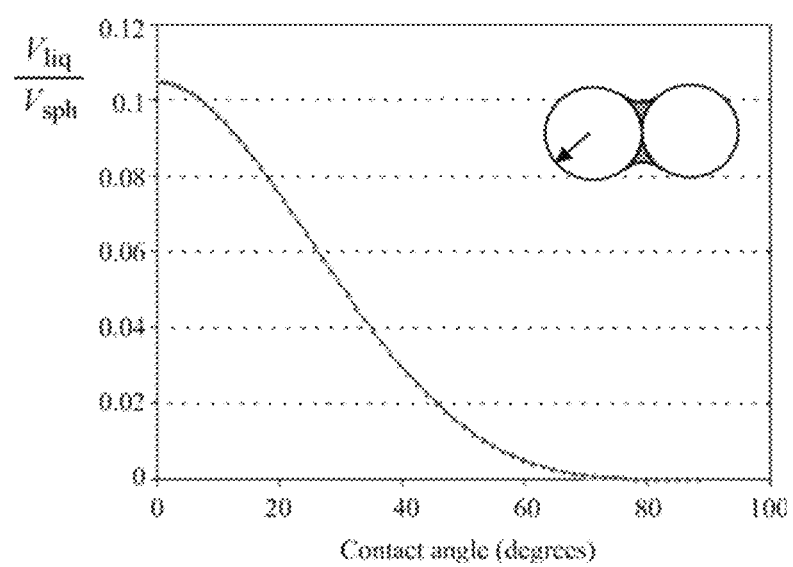
FIG. 1 shows a chart of the contact angle as a function of AWC.

As used herein, the term "alkyl" means a monovalent saturated straight chain or branched hydrocarbon radical, typically a monovalent saturated ($C_1$-$C_{30}$) hydrocarbon radical, such as for example, methyl, ethyl, n-propyl, iso-propyl, n-butyl, sec-butyl, t-butyl, pentyl, or n-hexyl, which may optionally be substituted on one or more of the carbon atoms of the radical. In one embodiment, an alkyl radical is substituted on one or more carbon atoms of the radical with alkoxy, amino, halo, carboxy, or phosphono, such as, for example, hydroxymethyl hydroxyethyl, methoxymethyl, ethoxymethyl, isopropoxyethyl, aminomethyl, chloromethyl or trichloromethyl, carboxyethyl, or phosphonomethyl.

As used herein, the term "alkylene" means a divalent saturated straight or branched chain hydrocarbon radical, such as for example, methylene, dimethylene, trimethylene.

As used herein, the terminology "($C_x$-$C_y$)" in reference to an organic group, wherein x and y are each integers, indicates that the group may contain from x carbon atoms to y carbon atoms per group.

As used herein, the term "degree of substitution" or "substitution degree", in reference to the level of substitution for polysaccharides, means the average amount of hydroxyl groups on polysaccharides that are substituted by or functionalized with the target functional group for single sugar unit.

The term "Available Water Capacity" or "AWC" means generally the amount of water that a soil can store that is available for use by plants. It is the water held between field capacity and the wilting point adjusted downward for rock fragments and for salts in solution. Field capacity is the water retained in a freely drained soil about 2 days after thorough wetting. The wilting point is the water content at which sunflower seedlings wilt irreversibly.

Available soil water capacity (AWC) is typically measured using the following equation:

AWC(%)=FC-PWP

Where: FC=Field capacity (%) and PWP=Permanent wilting point (%)

Field capacity (FC) is the amount of soil moisture or water content held in soil after excess water has drained away and the rate of downward movement of the water has materially decreased. This typically happens within 2-3 days after a rain or irrigation in previous soils of uniform structure and texture. Permanent wilting point (PWP) or wilting point (WP) is defined as the minimal point of soil moisture the plant requires not to wilt.

An apparatus, typically, a pressure plate apparatus is utilized to measure AWC. Other materials, apparent to those skilled in the art, including 50 ml burettes can be utilized. It is also understood that variation of the described procedure can be employed to measure AWC. Other processes to test the AWC in soils may also be utilized such as pressure plate extractors for testing of soils as described in the background section of U.S. Pat. No. 6,718,835.

Procedure for testing AWC is typically as follows:
1. Place the sample-retainer rings on the porous plate. Using a teaspoon or small scoop, take a random, grab sample of soil <2 mm diameter, and dump the whole sample into the ring taking care to avoid particle size segregation. Level the soil. Carry out duplicate samples.

2. Add distilled water to the surface of the porous plate until it reaches halfway up the outside of the rings. Cover the plate and allow it to stand overnight, adding more water as required to maintain the level.

3. When the soils are saturated, carefully transfer the plate to the pressure chamber and connect the outlet tube. Connect the outflow tube from the pressure chamber to the bottom of 50 mL burette. Referring to Table 1, apply the appropriate pressure.

4. When equilibrium has been reached (minimum 24 hrs) as shown by no change in volume in the draining burette, close the burette tap and release the pressure in the chamber. Transfer the soil from each ring to a weighing tin and determine the moisture content according to the Soil Moisture Content (P1A/1).

5. Repeat the procedure for other required pressures.

TABLE 1

Comparison of pressure and pF

| kPa | Bar | Atm | pF | Description |
| --- | --- | --- | --- | --- |
| 10 | 0.10 | 0.099 | 2.0 | FC |
| 20 | 0.20 | 0.197 | 2.31 | |
| 35 | 0.35 | 0.346 | 2.55 | |
| 60 | 0.60 | 0.592 | 2.79 | |
| 100 | 1.00 | 0.987 | 3.01 | |
| 200 | 2.00 | 1.974 | 3.31 | |
| 500 | 5.0 | 4.936 | 3.71 | |
| 1000 | 10.00 | 9.872 | 4.01 | |
| 1500 | 15.00 | 14.807 | 4.20 | PWP |

The term "soil hydrophilization" means generally the treatment of soil with a soil additive, which results in the increase of the hydrophilicity of the soil. The degree of soil hydrophilization can be measured by a floating experiment with ethanol and water mixture.

Procedure for testing soil hydrophilization is typically as follows:
1. A solution or suspension of soil additive was sprayed homogeneously on a soil. The soil was allowed to dry at ambient condition. The amount of soil additive treatment was controlled by the concentration and volume of soil additive solution/suspension that was sprayed on soil.

2. A mixture of ethanol and water solution was added to a testing vessel, typically a Petri dish.

3. A representative amount of treated soil was spread on to the ethanol/water mixture solution surface.

4. The percentage of soil particles that floated on the ethanol/water mixture solution-air interface was calculated by a standard imaging analysis or any other similar technologies. This number of percentage was used as an indicator of soil hydrophilization.

As used herein, the term "water stress test" means a test of plant growth response in a treated soil to the shortage of water supply.

Procedure for testing soil hydrophilization is typically as follows:
1. A selected plant was planted in a soil medium, and allowed to germinate and grow to certain stage of its life cycle. The soil medium can be a standard growth chamber or any other greenhouse facility. Soil was treated with soil additive either in-situ or before planting.

2. Water supply was stopped, and the only water source for plant usage was water retained in soil.

3. The growth of plant was recorded by either survival percentage of plant after certain period of time or the bio-mass harvested.

The present invention addresses the problems of prior art in that surfactant effectiveness on soil is typically of short duration and limited effectiveness. While surfactants, such as polyethleneoxide/polypropyleneoxide copolymers and charged surfactants may reduce the surface tension of the irrigation water and enhance the water wetability of the soil, there are disadvantages. For example, surfactants are often intrinsically less effective to improve the soil water holding capacity; the duration of surfactants is usually very short, and frequent application of surfactants, which is costly, is needed to prevent the recurrence of soil water repellence, and; as small molecules, surfactants tend to leach into aquifer or surface water reservoirs (rivers, lakes, and oceans) and raise significant environmental concerns.

There are likewise disadvantages in using superabsorbents. The disadvantages of superabsorbents as soil additives include: the relative high cost for agriculture application to achieve meaningful performance; the limited and decreasing performance when applied in soil; the competition for fresh water with plants, and; extra work needed to bury them near the root zone.

The present invention is a soil hydrophilization agent used as a soil additive, or a composition including a soil hydrophilization agent used as a soil additive, that can increase soil available water capacity. The present invention is also a method of utilizing these soil hydrophilization agents or compositions thereof on soil to increase AWC.

These soil hydrophilization agents, when applied by themselves or with irrigation water and/or precipitation, can bind to soil particles to render a favorable surface wetting properties and/or help to maintain porous soil structure to increase water holding capacity or AWC of the soil. Water can readily infiltrate into the soil and be stored in the treated soil and be available for plant usage.

More water can be retained in soil by modification of soil surface properties and soil structure. It is known that water is stored in soil mainly in three forms: a) absorption water is tightly bound to soil chemically or physically, and unavailable for plant usage; b) loosely bound water is the water that soil can not hold against the force of gravity (this water is usually from the application of large amount of fresh water and temporarily retained in large soil pores or channels. This water is typically lost, e.g., to an underground aquifer, due to gravity force after a relatively short period of time and is, thus, not available for plant usage); and c) available water is soil water that can be used by plants. This water is stored in soil pores or channels of small to medium size or as condensation water. It is believed that the greater the hydrophobicity of soil particle surfaces in a target soil the less AWC is available in the soil, as shown in FIG. 1. Thus, the present invention is a soil additive that is capable of hydrophilizing soil particles in a targeted area thereby increasing the AWC of the targeted soil. In one embodiment, the present invention is a soil additive that is capable of modifying a portion of, substantially all of or all of the surface of a soil particle.

In one embodiment, the soil additive comprises the hydrophilizing agent. In another embodiment, the soil additive is a mixture comprising the hydrophilizing agent along with other components including but not limited to surfactants and dispersing agents. In one embodiment, the hydrophilizing agent of the present invention is in aqueous solution.

Figure 2:
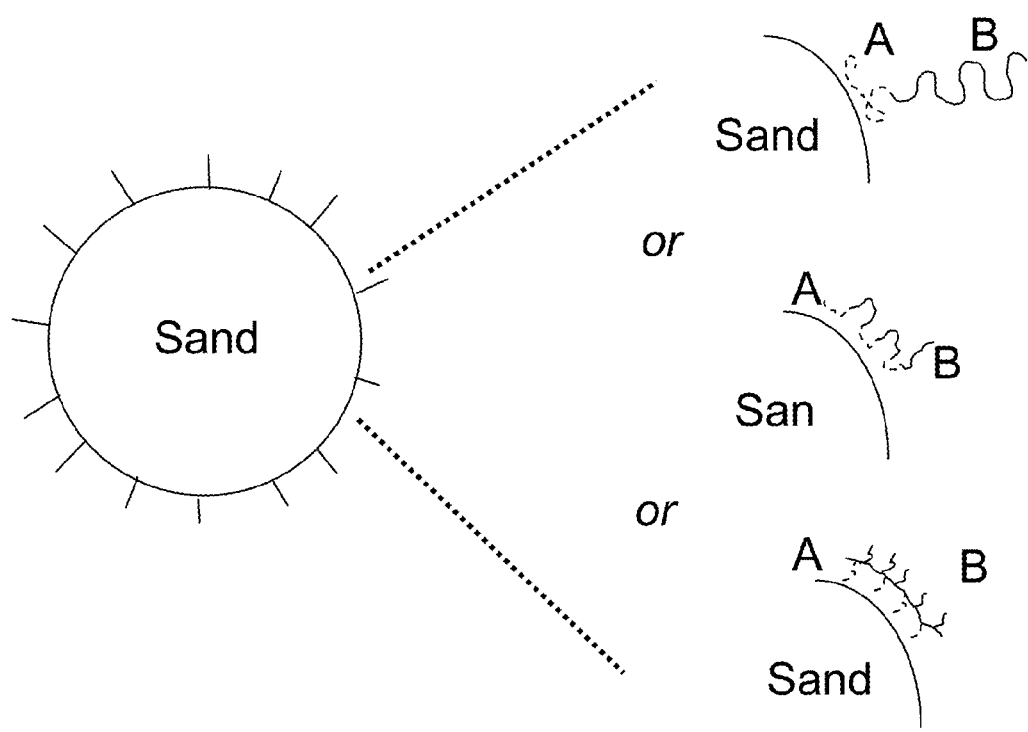
FIG. 2 illustrate exemplary embodiments of the hydrophilization agent of the present invention comprising one or more soil binding portions and one or more water binding portions.

Typically, the hydrophilization agent of the present invention can have the following structural specifications. It could have (i) a soil binding functional group that attaches to a portion of or substantially all of the surface of a soil particles and (ii) a water binding functional group (i.e., hydrophilizing unit) that attaches to one or more water molecules. In another embodiment, the hydrophilization agent could comprise (i) a soil binding functional group that has an affinity for a portion of or substantially all of the surface of a soil particles and (ii) a water binding functional group (i.e., hydrophilizing unit) has an affinity for one or more water molecules. In yet another embodiment, the hydrophilization agent could comprise (i) a soil binding functional group that is proximate to the surface of a soil particles and (ii) a water binding functional group (i.e., hydrophilizing unit) is proximate to one or more water molecules. Exemplary illustrations are shown in FIG. 2, where "A" contains a soil binding functional group and "B" contains a water binding group. The types of the interaction between the hydrophilization agent with soil and water can be of any suitable interaction and the hydrophilization agent comprising groups A and B can be of any suitable structure. One skilled in the art would understand that the structures in FIG. 2 are embodiments of the present invention with are not limiting.

In one embodiment, the hydrophilizing agent is a copolymer comprising a hydrophobic portion comprising one or more soil binding functional groups that attach to, are proximate to or have an affinity for a soil particle surface. The soil particle surface in some instances can turn hydrophobic especially after cultivation, thus leading to the drawbacks as described herein. The soil binding functional group of the polymer or copolymer is believed to have an affinity for such hydrophobic surface. The hydrophilizing agent also comprises a hydrophilic portion comprising one or more functional groups that attach to, are proximate to or have an affinity for water.

In one embodiment, the soil hydrophilization agents are copolymers containing two types of building units: one is soil binding unit that will attach to the soil or soil surface; the other is the unit that improves the water storage capacity (i.e., hydrophilizing unit). In one embodiment, the soil binding unit and water binding unit (i.e., hydrophilizing unit) of the hydrophilization agents can have similar or the same chemical composition.

The soil binding unit or functional group can, in one embodiment, have the functionality of cationic groups (e.g., amines), phosphonate, phosphate, sulfonate, sulfate, carboxylic groups, zwitterionic groups, hydrogen-bond forming groups (eg. hydroxyl), silicate groups, siloxane groups, and other soil binding groups (eg. ethyleneoxide, propyleneoxide).

The hydrophilizing unit or water binding group, in one embodiment, can have the functionality of polyols, poly(carboxylic acids) and their salts, as well as polysulfonate.

In one embodiment, the soil hydrophilization agents are natural products functionalized with hydrophilizing or water binding groups. The natural products can be starch, guar, and other polysaccharides. The functional groups can be cationic groups (eg. amines), phosphonate, phosphate, sulfonate, sulfate, carboxylic groups, zwitterionic groups, hydrogen-bond forming groups (eg. hydroxyl), and other hydrophilization agents.

The present invention, in another embodiment, is directed to soil additive compositions that comprise a polymer having a first portion that has an affinity for a soil particle or, more specifically at least part of the surface of a soil particle, and a second portion having an affinity for water. The first portion is analogous to the soil binding unit, and the second portion is analogous to the hydrophilizing unit. In one embodiment, the polymer comprises a hydrophobic portion that is attracted to the soil particle or surface of the soil particle, and a hydrophilic portion that is attracted to water.

In one embodiment, the soil hydrophilization agents are capable of improving soil structural porosity.

In another embodiment, the soil additive of the present invention is a polymer having a weight average molecular weight of between about 5,000 daltons and 500,000 daltons. In another embodiment, the soil additive of the present invention is a polymer having a weight average molecular weight of between about 200,000 daltons and 1,000,000 daltons. In another embodiment, the soil additive of the present invention is a polymer having a weight average molecular weight of up to about 5,000,000 daltons. In another embodiment, the soil additive of the present invention is a polymer having a weight average molecular weight of up to about 25,000,000 daltons. In a further embodiment, the soil additive of the present invention is a polymer having a weight average molecular weight of up to about 50,000,000 daltons. In yet a further embodiment, the soil additive of the present invention is a hydrogel particle having a size of between 50 nanometers to 5 micrometers.

The polymers that have found particular utility in the present invention comprise any suitable natural polymer, synthetic polymer, derivatives thereof or any combination thereof, as will be described in greater detail below.

In one embodiment, the soil hydrophilization agents comprise natural polymers and their derivatives. Natural polymer can comprise polysaccharides. Examples of suitable polysaccharides include but are not limited to galactomannan polymers, guar, starch, dextrins, chitin/chitosan, alginate compositions, cassia gum, tara gum, xanthan gum, locust beam gum, carrageenan gum, gum karaya, gum arabic, hyaluronic acids, succinoglycan, pectin, crystalline polysaccharides, branched polysaccharide, cellulose, as well as other derivatives thereof such as ionic and/or non-ionic derivatives and other derivates of any of the foregoing.

The polysaccharides may be modified to be neutral, anionic, amphoteric or cationic polysaccharides. In one embodiment, the polysaccharides are modified into cationic polysaccharides. The term "cationic polysaccharide" means a polysaccharide that has been chemically modified to provide the polysaccharide with a net positive charge in its main structure and counterions in the aqueous medium under a pH neutral condition.

Examples of polysaccharides include, but are not limited to, polysaccharides and polysaccharide derivatives selected from the group consisting of guar, hydroxyalkyl guar, carboxyalkyl guar, carboxyalkyl hydroxyalkyl guar, hydrophobically modified guar, starch, hydrophobically modified hydroxyalkyl guar, hydrophobically modified carboxyalkyl guar, hydrophobically modified carboxyalkyl hydroxyalkyl guar, pectin, alginates, locust bean gum, gum arabic, gum ghatti, gum acacia, carrageenan, hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, starch, gum tragacanth, gum karaya, tara gum, tamarind gum, xanthan gum, welan gum, and succinoglucans, and mixtures thereof.

Examples of suitable guars include but are not limited to guar gum, hydroxypropyl guar gum, carboxymethyl guar gum, carboxymethylhydroxypropyl guar gum, and other modified guar gums.

In one embodiment, cationic polysaccharides include, but is not limited to, the polysaccharides with the addition of amino and/or ammonium group(s). These quaternary ammonium substituents may be introduced into the polysaccharides via reactions with such as trimethylhydroxypropyl ammonium chloride, dimethylstearylhydroxypropyl ammonium chloride, or dimethyldodecylhydroxypropyl ammonium chloride. In one embodiment, the cationic polysaccharide is an ammonium quaternary substituted polysaccharide having a substitution degree from about 0.001 to about 6. In another embodiment, the cationic polysaccharide is an ammonium quaternary substituted polysaccharide having a substitution degree from about 0.01 to about 3. In yet another embodiment, the cationic polysaccharide is an ammonium quaternary substituted polysaccharide having a substitution degree from about 0.001 to about 1.

In one particular embodiment, the cationic polysaccharide is a cationic guar. The cationic group or groups associated with the cationic guar can be any of the cationic substituent groups described herein.

In one particular embodiment, the cationic substituent group is of formula:

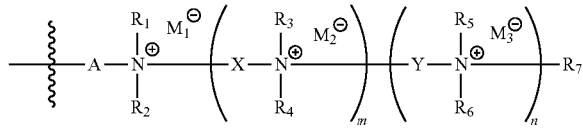

"A", "X", "Y" each can individually be a $C_1$-$C_{10}$ alkyl, a $C_1$-$C_{10}$ alkoxyl, a $C_1$-$C_{10}$ hydroxylalkyl or a $C_1$-$C_{10}$ alkylcarbonyl linking group, with or without heteroatoms. $M_1$, $M_2$, and $M_3$ can each individually be any suitable counter ion(s); $R_1$, $R_2$, $R_3$, $R_4$, $R_5$, $R_6$, and $R_7$ can each individually be hydrogen, a $C_1$-$C_{10}$ alkyl, a $C_1$-$C_{10}$ alkoxyl, a $C_1$-$C_{10}$ hydroxylalkyl, a $C_1$-$C_{10}$ alkoxyalkyl or a $C_1$-$C_{10}$ alkylalkoxyl; wherein "m" and "n" are, individually, zero or an integer from 1 to 10000

Cationic groups suitable for use in connection with the present invention include quaternary ammonium groups. Typical quaternary ammonium groups are tetramethylammonium chloride and bromide, benzyltrimethylammonium chloride and bromide, tetraethylammonium chloride and bromide, tetrabutylammonium chloride and bromide, methylpyridinium chloride and bromide, benzylpyridinium chloride and bromide, trimethyl-p-chlorobenzylammonium chloride and bromide, and the like.

Specific substituents include glycidyltrialkylammonium salts and 3-halo-2-hydroxypropyltrialkylammonium salts such as glycidyltrimethylammonium chloride, glycidyltriethylammoniu-m chloride, gylcidyltripropylammonium chloride, glycidylethyldimethylammon-ium chloride, glycidyldiethylmethylammonium chloride, and their corresponding bromides and iodides; 3-chloro-2-hydroxypropyltrimethylammo-nium chloride, 3-chloro-2-hydroxypropyltriethylammonium chloride, 3-chloro-2-hydroxypropyltripropylammonium chloride, 3-chloro-2-hydroxypropylethyldimethylammonium chloride, 2,3-epoxypropyl N,N,N-trimethylammonium chloride, 3-chloro-2-hydroxypropyl N,N,N-dodecyldimethylammonium chloride, 3-chloro-2-hydroxypropyl N,N,N-cocoalkyldimethylammonium chloride, and 3-chloro-2-hydroxypropyl N,N,N-octadecyldimethylammonium chloride and their corresponding bromides and iodides; and quaternary ammonium compounds such as halides of imidazoline ring containing compounds.

In one embodiment, the hydroxypropyl trimethylammonium guar has a substitution degree of between about 0.001 to about 3. In another embodiment, the hydroxypropyl trimethylammonium guar has a substitution degree of between about 0.01 to about 1.

In one embodiment, a cationic groups suitable for use in connection with the present invention has the formula:

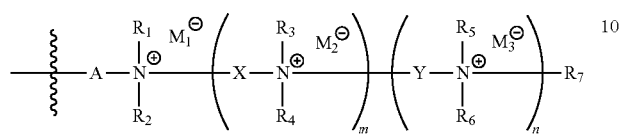

wherein "A", "X", "Y" are, individually, a $C_1$-$C_{10}$ alkyl, a $C_1$-$C_{10}$ alkoxyl, a $C_1$-$C_{10}$ hydroxylalkyl or a $C_1$-$C_{10}$ alkylcarbonyl linking group, with or without heteroatoms; wherein $M_1$, $M_2$, and $M_3$ are, individually, counter ions; wherein $R_1$, $R_2$, $R_3$, $R_4$, $R_5$, $R_6$, and $R_7$ are each, individually, hydrogen, a $C_1$-$C_{10}$ alkyl, a $C_1$-$C_{10}$ alkoxyl, a $C_1$-$C_{10}$ hydroxylalkyl, a $C_1$-$C_{10}$ alkoxyalkyl or a $C_1$-$C_{10}$ alkylalkoxyl; wherein "m" and "n" are, individually, zero or an integer from 1 to 10000.

In another embodiment, a cationic or chargeable group suitable for use in connection with the present invention has the formula:

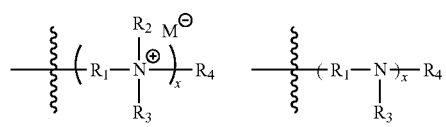

wherein "$R_1$" is a $C_1$-$C_{10}$ alkyl, a $C_1$-$C_{10}$ alkoxyl, a $C_1$-$C_{10}$ hydroxylalkyl or a $C_1$-$C_{10}$ alkylcarbonyl linking group, with or without heteroatoms; wherein $R_2$, $R_3$ and $R_4$ are, individually, hydrogen, a $C_1$-$C_{10}$ alkyl, a $C_1$-$C_{10}$ alkoxyl, a $C_1$-$C_{10}$ hydroxylalkyl, a $C_1$-$C_{10}$ alkoxyalkyl or a $C_1$-$C_{10}$ alkylalkoxyl; wherein "x" is an integer from 1 to 10000; wherein "M" is a counter ion comprising chloride, bromide or sulfonate.

In another embodiment, a cationic group suitable for use in connection with the present invention has the formula:

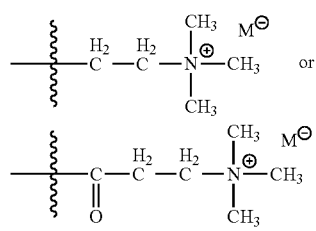

wherein "M" is a counter ion comprising chloride, bromide or sulfonate.

In another embodiment, a cationic group suitable for use in connection with the present invention has the formula:

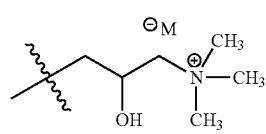

wherein "M" is a counter ion comprising chloride, bromide or sulfonate.

In another embodiment, a cationic or chargeable group suitable for use in connection with the present invention has the formula:

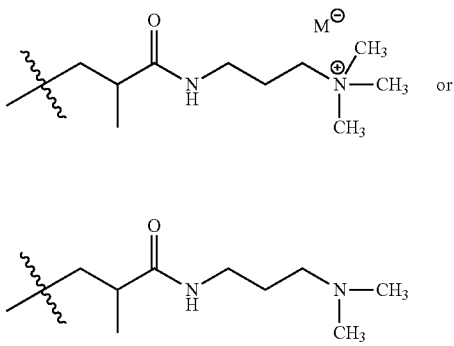

wherein "M" is a counter ion comprising chloride, bromide or sulfonate.

In another embodiment, a cationic group suitable for use in connection with the present invention has the formula:

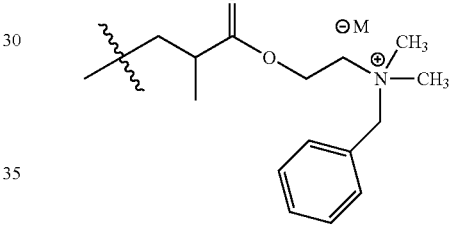

wherein "M" is a counter ion comprising chloride, bromide or sulfonate.

In another embodiment, a cationic or chargeable group suitable for use in connection with the present invention has the formula:

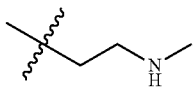 [SMILES: *CCNC]

In another embodiment, a cationic group suitable for use in connection with the present invention has the formula:

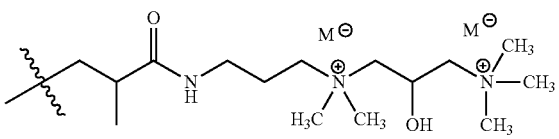

wherein "M" is a counter ion comprising chloride, bromide or sulfonate.

In another embodiment, a cationic group suitable for use in connection with the present invention has the formula:

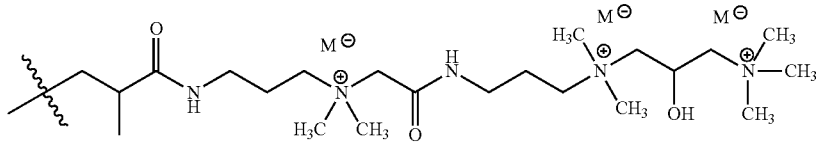

wherein "M" is a counter ion comprising chloride, bromide or sulfonate.

In one embodiment, the polymer is in the form of a salt with a suitable counterion, where the polymer is either in a dry state or in a suspension (aqueous or solvent based).

The cationic guar used in the present invention can be produced using a variety of methods. For example, after addition of the alcohol or alcohol/water solution and the subsequent neutralization, followed by agitation as needed, a cationic reagent is added so that the guar gum is derivatized with one or more cationic groups. Cationic substituents include primary, secondary, or tertiary amino groups or quaternary ammonium, sulfonium or phosphinium groups.

Methods for making suitable natural polymer derivatives are also generally known in the art. The cross-linking processes of polysaccharides were described in US Publication No. 20030027787 and U.S. Pat. No. 5,532,350. The attachment of functional groups to polysaccharides can be processed in similar conditions described.

In one embodiment, cationic polysaccharides are utilized as the hydrophilizing agent of the present invention, which include but are not limited to any naturally occurring cationic polysaccharide as well as polysaccharides and polysaccharide derivatives that have been cationized by chemical means, e.g. quaternization with various quaternary amine compounds containing reactive chloride or epoxide sites. Methods for preparation of the cationic polysaccharides are disclosed in U.S. Pat. Nos. 4,663,159; 5,037,930; 5,473,059; 5,387,675; 3,472,840; 6,639,126 and 4,031,307, incorporated herein by reference. Cationic derivatives are obtained by reaction between the hydroxyl groups of the polysaccharide and reactive chlorides or epoxide sites. The degree of substitution of the cationic groups onto the polysaccharide structure must be sufficient to provide the requisite cationic charge density.

In one embodiment, functionalized polysaccharides as the hydrophilizing agent of the present invention are produced by e-beam process as disclosed in U.S. Pat. No. 2006029561 and EP Pat. No. 1,890,670. In one embodiment, functionalized polysaccharides as the hydrophilizing agent of the present invention comprise polysaccharides containing natural amine groups, such as in chitosan, or non-natural primary amine groups. Methods for preparation of amine-containing polysaccharides are disclosed in U.S. Pat. No. 6,455,661.

In one embodiment, cationic guars are utilized as the hydrophilizing agent of the present invention. Methods for preparation of the cationic guars are disclosed in U.S. Pat. Nos. 5,489,674; 20080033163; EP Pat. Nos. 934,343; 686,643 and WO Pat. No. 2008058769.

In one embodiment, functionalized polysaccharides as the hydrophilizing agent of the present invention comprise amphoteric groups. In one embodiment, amphoteric guars are utilized as the hydrophilizing agent of the present invention. Methods for preparation of the amphoteric guars are disclosed in U.S. Pat. No. 6,210,689.

In one embodiment, the soil hydrophilization agents comprise synthetic polymers. The synthetic polymer used in the present invention may be a homopolymer or a copolymer. Suitable polymers include linear polymers, branched polymers, star polymers, comb polymers, and any combinations of the above. Suitable copolymers include random copolymers, alternating copolymers, block copolymers, graft copolymers, and any combinations of the above.

In one embodiment, the soil hydrophilization agents comprise synthetic polymers that contain carboxylate groups, amide groups, hydroxyl groups, zwitterionic groups or a combination of any of the foregoing.

The polymerizable monomers are typically water-soluble chargeable monomers having carboxylic groups, sulfonate groups, phosphonate groups and the like.

In one embodiment, the polymerizable monomers having one or more carboxylic groups include but are not limited to acrylic acid, methacrylic acid, crotonic acid, sorbic acid, maleic acid, itaconic acid, cinnamic acid, its salt or the like, or an anhydride thereof (maleic anhydride or the like).

In one embodiment, the polymers used in the present invention comprise cationic or changeable grafted homopolymer or copolymer units.

In another embodiment, the polymer utilized in the present invention comprise one or more cationic units of the following formula:

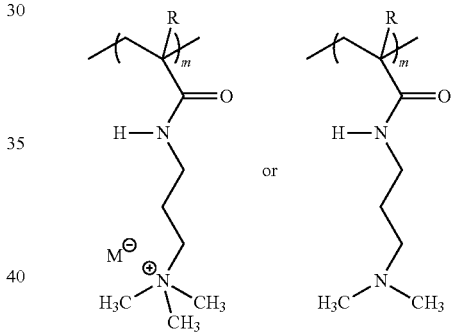

wherein R is a hydrogen or a $C_1$-$C_{100}$ alkyl group; wherein "$M^-$" can be any suitable counterion; and wherein m is an integer of from 2 to 10000.

In another embodiment, a cationic group suitable for use in connection with the present invention comprises a cationic or changeable grafted homopolymer or copolymer unit. This homopolymer unit or one component of the copolymer unit has the formula:

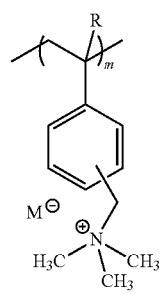

wherein R is a hydrogen or a $C_1$-$C_{100}$ alkyl group; wherein "$M^-$" can be any suitable counterion; wherein m is an integer of from 2 to 10000; and wherein there are from 1 to 3 substitution groups on the phenyl ring, where the position of the substitution group(s) can be in any of ortho-, meta, and para-position.

In one embodiment, a cationic group suitable for use in connection with the present invention comprises a cationic or changeable grafted homopolymer or copolymer unit. This homopolymer unit or one component of the copolymer unit has the formula:

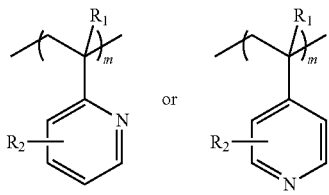

wherein $R_1$ is a hydrogen or a $C_1$-$C_{100}$ alkyl group; wherein $R_2$ can be a hydrogen, or a branched, linear or cyclic $C_1$-$C_6$ hydrocarbon with or without heteroatom, and there can be from 1 to 3 substitution groups on the phenyl ring, and the position of the substitution group(s) can be in any of ortho-, meta, and para-position; and wherein m is an integer of from 2 to 10000.

In another embodiment, a cationic group suitable for use in connection with the present invention comprises a cationic or changeable grafted homopolymer or copolymer unit. This homopolymer unit or one component of the copolymer unit has the formula:

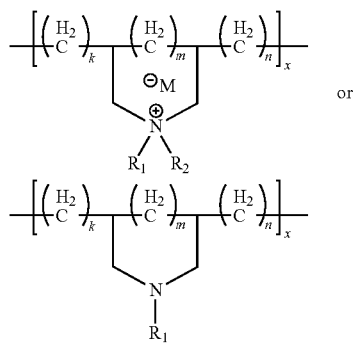

wherein $R_1$ and $R_2$ are, individually, a hydrogen, or a branched, linear or cyclic $C_1$-$C_6$ hydrocarbon with or without heteroatom; wherein "M$^-$" can be any suitable counterion; wherein "k" and "n" are an integer of from 1 to 5; wherein "m" is absent or an integer of from 1 to 5; and wherein "x" is an integer of from 2 to 10000.

In another embodiment, a cationic group suitable for use in connection with the present invention comprises a cationic or changeable grafted homopolymer or copolymer unit. This homopolymer unit or one component of the copolymer unit has the formula:

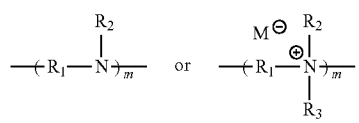

wherein $R_1$ is a linear or branched $C_1$-$C_5$ hydrocarbon group, or a $C_1$-$C_5$ alkoxy group; wherein $R_2$ and $R_3$ are, individually, a hydrogen, or a branched, linear or cyclic $C_1$-$C_6$ hydrocarbon with or without heteroatom; wherein "M$^-$" can be any suitable counterion; and wherein "m" is an integer of from 2 to 10000.

In another embodiment, a cationic group suitable for use in connection with the present invention comprises a cationic or changeable grafted homopolymer or copolymer unit. This homopolymer unit or one component of the copolymer unit has the formula:

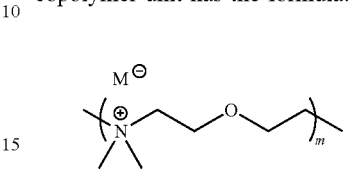

wherein "M$^-$" can be any suitable counterion; and wherein "m" is an integer of from 2 to 10000.

In another embodiment, a cationic group suitable for use in connection with the present invention comprises a cationic or changeable grafted homopolymer or copolymer unit. This homopolymer unit or one component of the copolymer unit has the formula:

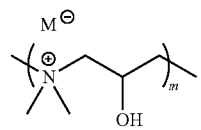

wherein "M$^-$" can be any suitable counterion; and wherein "m" is an integer of from 2 to 10000

The cationic polysaccharide of the present invention can have a degree of substitution of from about 0.001 to about 6, typically from about 0.01 to about 3.

It is understood that the cationic or changeable grafted homopolymer or copolymer units as described in the embodiments above can form a polymer alone or in combination with other homopolymers or copolymers from other described embodiments. It is also understood that the cationic or changeable grafted homopolymer or copolymer units as described in the embodiments above can form polymers with polysaccharides and/or naturally occurring polymers including but not limited to guar.

In one embodiment, the polymer composition of the present invention comprises one or more monomeric units derived from at least one monomer according to formula (I):

wherein $R_1$, $R_2$ and $R_3$ individually represent a hydrogen, or a branched, linear or cyclic $C_1$-$C_6$ hydrocarbon with or without heteroatom; wherein A is either absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl.

In one embodiment, the polymer composition comprises one or more monomeric units derived from at least one monomer according to formula (II):

(II)

wherein $R_1$, $R_2$ and $R_3$ individually represent a hydrogen, or a branched, linear or cyclic $C_1$-$C_6$ hydrocarbon with or without heteroatom; wherein M can be any couterion or hydrogen; wherein A is either absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl.

In one embodiment, the polymer composition comprises one or more monomeric units derived from at least one monomer according to formula (III):

(III)

wherein $R_1$, $R_2$, $R_3$ and R4 individually represent a hydrogen, or a branched, linear or cyclic $C_1$-$C_6$ hydrocarbon with or without heteroatom; wherein A is either absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$alkylalkoxyl.

In one embodiment, the polymer composition comprises an end capping group comprising one or multiple phosphonate groups, silicate groups, siloxane groups, phosphate groups, phosphinate groups or any combination thereof. The end capping group may be attached to polymer backbone of the composition, typically, to a terminal monomeric unit.

The end cap group, for example, in one specific embodiment is of formula (IV)

(IV)

wherein A is phosphorous or carbon and $R_4$, $R_5$, $R_6$ individually represent hydrogen, a phosphonate group, a silicate group, a siloxane group, a phosphate group, a phosphinate group, an alkylphosphonate group, an alkylsilicate group, an alkylsiloxane group, an alkylphosphate group, an alkylphosphinate group or any combination thereof.

In one embodiment, the polymer composition of the present invention is a random copolymer, alternating copolymer, block copolymer, or graft copolymer comprising monomeric units derived from at least the monomers according to formula (I), formula (II) and/or formula (III). The end capping group according to formula (IV) may optionally be attached to the polymer composition, typically at a terminal monomer group. In one embodiment, the polymer composition is a random copolymer, alternating copolymer, block copolymer, or graft copolymer comprising monomeric units derived from the monomers according to formula (I) and formula (II). In yet another embodiment, the polymer composition is a random copolymer, alternating copolymer, block copolymer, or graft copolymer comprising monomeric units derived from the monomers according to formula (I) and formula (III), wherein the group according to formula (IV) is attached to a terminal monomer group of the polymer chain.

The production processes of the soil additives in the present invention are generally known in the art. Methods for making suitable polymers are documented in U.S. Pat. No. 5,202,400, U.S. Publication No. 20040024104, and WO Patent No. 2006131213. Polymers can be made from radical polymerization, condensation polymerization, anionic polymerization, cationic polymerization, ring open polymerization, coordination polymerization, and metathesis polymerization, and the like. Examples of suitable radical polymerization processes include but are not limited to solution polymerization process, emulsion polymerization process, suspension polymerization process, reverse-phase suspension polymerization process, thin film polymerization process, and spray polymerization process, and the like.

In one embodiment, the polymer composition of the present invention comprises polyamines, and polyimines.

In one embodiment, the polymer composition of the present invention comprises poly(ethylene oxide), poly(propylene oxide) as parts or all of their substitution groups.

In one embodiment, the polymer composition of the present invention comprises amino-oxide functionality.

In some embodiment, the soil additive is a mixture of the hydrophilizing agent of the present invention with other compounds including but not limited to dispersing agents and surfactants.

The present invention is also directed to a method of utilizing a polymer composition of the present invention on soil to increase the available water capacity of such soil.

In one embodiment, the polymer composition is admixed into a solution or suspension and applied to the soil surface. The application of the hydrophilization agent of the present invention can be accomplished in variety of way including but not limited to spraying into, casting into, as well as mulching, tilling or otherwise incorporating into the top layers (e.g., 1 inch, 2 inch, 3-5 inches, 6-13 inches of top layer of soil) of soil.

Experiments

The hydrophilizing agents utilized comprised portions A and B what were believed to be (A) sites that bind or have an affinity for or interaction (e.g., electrostatic) with the soil (typically, the soil surface) and (B) sites that bind or have an affinity for or an interaction (e.g., electrostatic) with water. The soil samples were then tested using an AWC testing method similar to that described herein. Soil samples were placed on a pressure plate which was enclosed in a pressure chamber.

Other soil hydrophilization agents were tested. For example, other polymers included a zwitterion-containing polymer (Rhodia 4), cationic polysaccharides (Rhodia 5), Geropon T-36, Homopolymer (Polycare 133), Mirapol A-15 (wt), and PQ-11. It is believed that there are (A) portions of these soil hydrophilization agents that bind to soil, i.e., soil binding units, and (B) portions of these soil hydrophilization agents that bind with water, i.e., hydrophilizing units. The result is that a targeted soil has an increase in AWC.

The soil samples were first saturated with water. The pressure plate allowed only the pass of water, not air. The chamber was pressurized at different pressures. Excess water was removed at equilibrium. The water content was determined at each pressure level to give soil moisture curve. From this curve, soil available water capacity can be determined.

Figure 3:
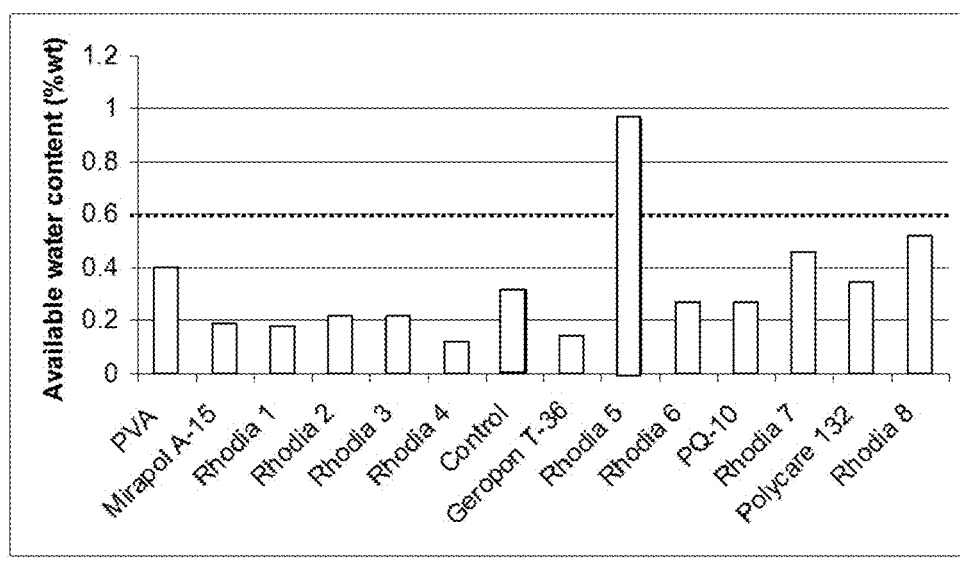
FIG. 3 illustrates different compounds and their effects on AWC.

As shown in FIG. 3, cationic polysaccharides (Rhodia 5) significantly increased soil available water capacity (AWC). Soil treated with cationic polysaccharides (Rhodia 5) had an AWC of 0.96%, about 3 times larger than the AWC in control soil (0.32%). Functionalized polysaccharides provided unique ability to increase AWC.

As shown in FIG. 3, phosphonate end-cap poly(sulfonate-co-acrylic acid) ("Rhodia 7") showed increased soil AWC of 0.46%. Poly(sulfonate-co-phosphonate) ("Rhodia 8") also showed increased soil AWC of 0.52%. Polysulfonates provided unique ability to increase AWC.

In one embodiment, the phosphonate end-cap poly(sulfonate-co-acrylic acid) comprises the following formula:

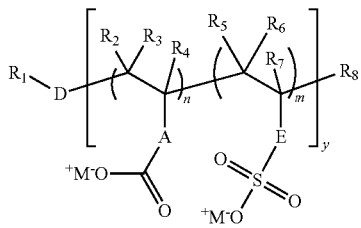

wherein n is an integer of from 10 to 10000; wherein m can be an integer of from 0 to 10000; wherein y is an integer of from 1 to 10000, wherein $R_1$ comprises one or multiple phosphonate groups, silicate groups, siloxane groups, phosphate groups, phosphinate groups or any combination thereof; $R_2$-$R_8$ can individually be hydrogen, or a branched, linear or cyclic $C_1$-$C_6$ hydrocarbon with or without heteroatom; $M^+$ can be any suitable counterion or a hydrogen; wherein "A," "D" and "E" are each independently absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In one embodiment, n is an integer of from 1 to 10. In one embodiment, m is an integer of from 1 to 10. In one embodiment, y is an integer of from 1 to 10.

In another embodiment, the soil additive of present invention ("Rhodia 7") is of formula:

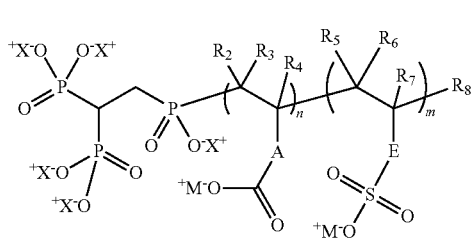

wherein n is an integer of from 10 to 10000; wherein m is an integer of from 10 to 10000; $R_2$-$R_8$ can individually be hydrogen, or a branched, linear or cyclic $C_1$-$C_6$ hydrocarbon or hydroxylalkyl groups; wherein $M^+$ and $X^+$ are, individually, different or the same counterion or a hydrogen; wherein "A" and "E" are each independently absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl.

In another embodiment, the soil additive is a Poly(sulfonate-co-phosphonate) type polymer ("Rhodia 8") having formula:

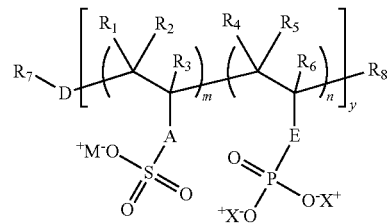

wherein m is zero or an integer of from about 1 to about 10000; wherein n is zero or an integer from about 0 to about 10000; wherein y is an integer of from 1 to 10000; wherein $M^+$ is a counterion or a hydrogen cation; wherein $X^+$ is a counterion or a hydrogen; wherein $R_1$-$R_8$ are, individually, hydrogen, a branched $C_1$-$C_6$ hydrocarbon, a linear $C_1$-$C_6$ hydrocarbon or a cyclic $C_1$-$C_6$ hydrocarbon or hydroxylalkyl groups; wherein "A", "D" and "E" are each independently absent or represent a linear or branched $C_1$-$C_5$ hydrocarbon group, a $C_1$-$C_5$ alkoxy group, -oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In one embodiment, m is an integer of from about 1 to 200 and n is an integer from about 1 to 50.

The soil samples were also tested of soil hydrophilization by floating experiment method similar to that described herein.

Figure 4:
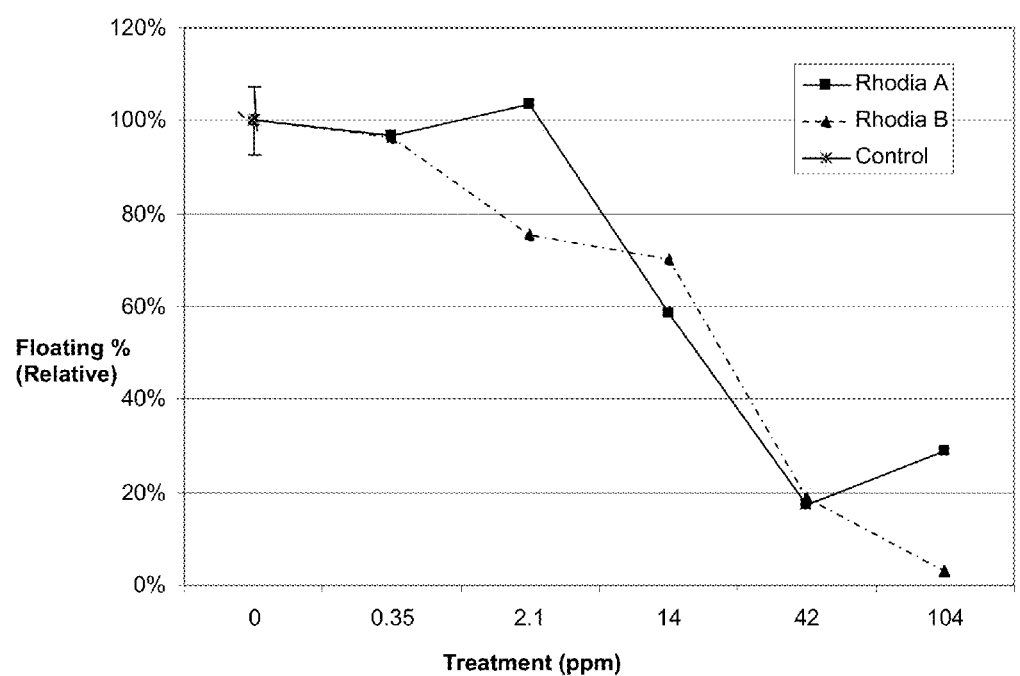
FIG. 4 is a graph of the percentage of soil particles that were observed floating with varying amounts of treatment dosages

As shown in FIG. 4, cationic polysaccharides (Rhodia A) gave a decreasing percentage of soil particles that floated with increasing amount treatment dosage. Functionalized polysaccharides provided unique ability to increase soil hydrophilization degree.

As shown in FIG. 4, phosphonate end-cap polymer (Rhodia B) gave a decreasing percentage of soil particles that floated with increasing amount treatment dosage. Phosphonate end-cap polymers provided unique ability to increase soil hydrophilization degree.

In one embodiment, the phosphonate end-cap polymer comprises the following formula:

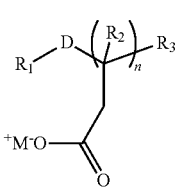

wherein n is an integer of from 1 to 1000; wherein $R_1$ comprises one or multiple phosphonate groups, silicate groups, siloxane groups, phosphate groups, phosphinate groups or any combination thereof; $R_2$-$R_3$ can individually be hydrogen, or a branched, linear or cyclic $C_1$-$C_6$ hydrocarbon with or without heteroatom; $M^+$ can be any suitable counterion or a hydrogen; wherein "D" is absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In one embodiment, n is an integer of from 1 to 10. In another embodiment, n is an integer of from 1 to 5.

In another embodiment, the soil additive of present invention ("Rhodia A") is of formula:

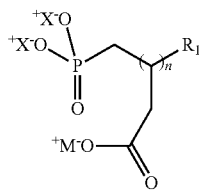

wherein n is an integer of from 1 to 1000; wherein $R_1$ comprises one hydrogen, or a branched, linear or cyclic $C_1$-$C_6$ hydrocarbon with or without heteroatom; $M^+$ and $X^+$ can be independently any suitable counterion or a hydrogen.

The soil samples were also tested with water stress test method similar to that described herein.

Figure 5:
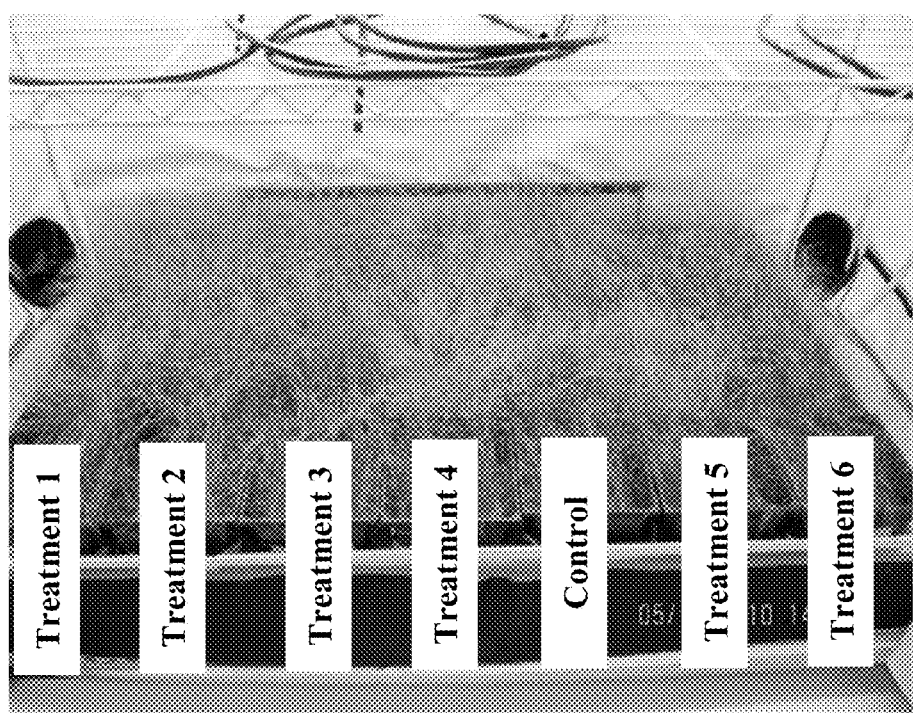
FIG. 5 is a photograph illustrating plant in pots of soil treated with cationic polysaccharides of the present invention, in a one month water stress test versus comparisons with pots of control and other benchmark treatments.

As shown in FIG. 5, plant in pots of soil treated with cationic polysaccharides (Treatment 3) remained green leaves in one month water stress test in comparison with pots of control experiment and other benchmark treatment (Treatment 5 and 6). Functionalized polysaccharides provided unique ability to increase plant survival rate in water stress test.

As shown in FIG. 5, plant in pots of soil treated with phosphonate end-cap polymer (Treatment 1) remained green leaves in one month water stress test in comparison with pots with control experiment and other benchmark treatment (Treatment 5 and 6). phosphonate end-cap polymers provided unique ability to increase plant survival rate in water stress test.

In one embodiment, the phosphonate end-cap polymer comprises the following formula:

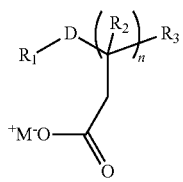

wherein n is an integer of from 1 to 1000; wherein $R_1$ comprises one or multiple phosphonate groups, silicate groups, siloxane groups, phosphate groups, phosphinate groups or any combination thereof; $R_2$-$R_3$ can individually be hydrogen, or a branched, linear or cyclic $C_1$-$C_6$ hydrocarbon with or without heteroatom; $M^+$ can be any suitable counterion or a hydrogen; wherein "D" is absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl.

In another embodiment, the soil additive of present invention ("Rhodia A") is of formula:

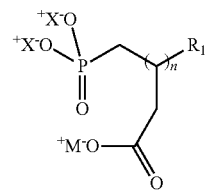

wherein n is an integer of from 1 to 1000; wherein $R_1$ comprises one hydrogen, or a branched, linear or cyclic $C_1$-$C_6$ hydrocarbon with or without heteroatom; $M^+$ and $X^+$ can be independently any suitable counterion or a hydrogen.

It is apparent that embodiments other than those expressly described herein come within the spirit and scope of the present claims. Accordingly, the present invention is not defined by the above description, but is to be accorded the full scope of the claims so as to embrace any and all equivalent compositions and methods.

What is claimed is:

1. A method of increasing the available water capacity in soil comprising applying a soil additive to soil, the soil additive comprising a cationic hydroxyalkyl guar polysaccharide polymer comprising (i) a first portion having an affinity for at least a portion of the surface area of a soil particle and (ii) a second portion having an affinity for water, wherein the cationic hydroxyalkyl guar polysaccharide polymer has a cationic group of formula:

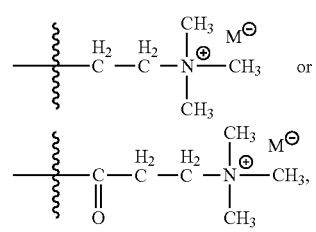

wherein -M- is a counterion comprising chloride, bromide or sulfonate, and
wherein the available water capacity in soil applied with the cationic hydroxyalkyl guar polysaccharide polymer is increased by at least 3 times compared to soil without the cationic hydroxyalkyl guar polysaccharide polymer.

2. The method of claim 1 wherein the cationic guar polysaccharide polymer comprises a weight average molecular weight of between about 100,000 daltons and 500,000 daltons.

3. The method of claim 1 wherein the cationic guar polysaccharide polymer comprises a weight average molecular weight of between about 200,000 daltons and 50,000,000 daltons.

4. The method of claim 1 wherein the cationic guar polysaccharide polymer has a substitution degree of between about 0.001 to about 6.

5. The method of claim 1 wherein the cationic guar polysaccharide polymer has a substitution degree of between about 0.01 to about 3.

* * * * *